Dec. 25, 1951   A. L. KRONQUEST ET AL   2,579,935
VACUUMIZING AND SEALING APPARATUS
Original Filed Sept. 19, 1942   5 Sheets-Sheet 4

ALFRED L. KRONQUEST &
MATTHEW M. SEDWICK
INVENTORS by Mason, Porter, Miller
& Stewart, Attorneys.

Dec. 25, 1951  A. L. KRONQUEST ET AL  2,579,935
VACUUMIZING AND SEALING APPARATUS
Original Filed Sept. 19, 1942  5 Sheets-Sheet 5

ALFRED L. KRONQUEST &
MATTHEW M. SEDWICK
INVENTORS

Patented Dec. 25, 1951

2,579,935

UNITED STATES PATENT OFFICE 2,579,935

VACUUMIZING AND SEALING APPARATUS

Alfred L. Kronquest and Matthew M. Sedwick, Syracuse, N. Y., assignors to Continental Can Company, Inc., New York, N. Y., a corporation of New York Original application September 19, 1942, Serial No. 458,990, now Patent No. 2,450,243, dated September 28, 1948. Divided and this application October 4, 1946, Serial No. 701,184

5 Claims. (Cl. 226—82.4)

This invention relates to container vacuumizing and sealing machines and more particularly to mechanism for seaming containers or cans of square or rectangular cross section and to controlled mechanism for inter-relating and timing the operation of the seaming mechanism and parts for positioning and otherwise preparing or conditioning a container for being seamed. The invention is embodied preferably in machines in which a pad or supporting element is arranged to move a container and a container top or cover relatively toward a chuck preliminary to bringing seaming rolls into operation. The container is vacuumized before the seaming operation is performed and the cans are held stationary during the seaming operation.

An object of the invention is to provide a machine of the character stated with novel and improved separate mechanisms and interlocking controls for insuring that the proper steps for conditioning the container and its contents for sealing will be performed before the container is seamed.

Another object of the invention is to provide a container sealing machine in which vacuumizing of a sealing chamber is effected automatically in response to the closing of the door on the sealing chamber.

Another object of the invention is to provide simple and effective means for centering or aligning a container with the chuck of the seaming machine.

A still further object of the invention is an arrangement by which the chamber in which the seaming mechanism is housed, will be sealed by the movement of the bell in which the container is held and vacuumized.

Other objects of the invention will be apparent from the following detailed description, the appended claims and the accompanying drawings of the preferred form of the invention.

This invention forms part of the disclosure of applicants' patent on a container sealing machine granted September 28, 1948, No. 2,450,243, from which this subject matter has been divided.

Figure 1:
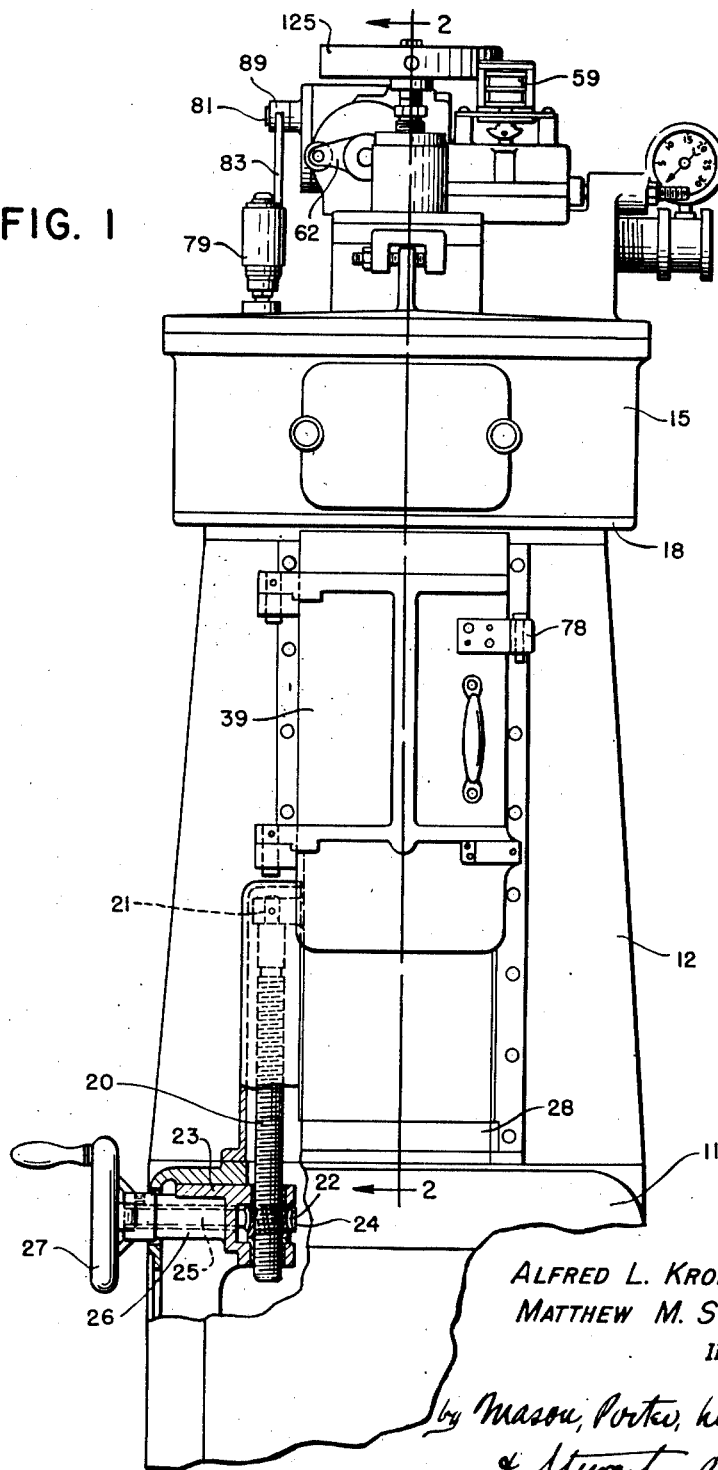
Fig. 1 is a front view in elevation of the seaming machine embodying my invention and with the mechanism cover removed.

Generally speaking, the invention forms part of a mechanism having provision to receive an open ended can filled with food stuffs or the like which it is desired to subject to a vacuum to seal hermetically with a cover and to discharge from the mechanism in timed sequence and without further attention or supervision on the part of the operator. For these purposes the mechanism includes a container-receiving bell, means for subjecting the bell and its contents to vacuum, positioning the can and its cover in engagement with seaming mechanism, sealing the cover to the can, breaking the vacuum and removing the sealed can.

As shown in the drawings, the mechanism comprises a base 11 constructed of cast metal or like rigid material upon which the operating mechanism and its housings can be rigidly assembled.

Upon the base 11 is attached a casing 12. This casing has a vertical partition 13 running across the casing and midway forward from the rear. The rear face of the partition forms a support for a suitable electric motor 14.

Above the casing 12 there is supported a housing 15 for seaming mechanism denoted generally by 16. This seaming mechanism is the same as that disclosed in the prior application of the applicants, above referred to.

Figure 2:
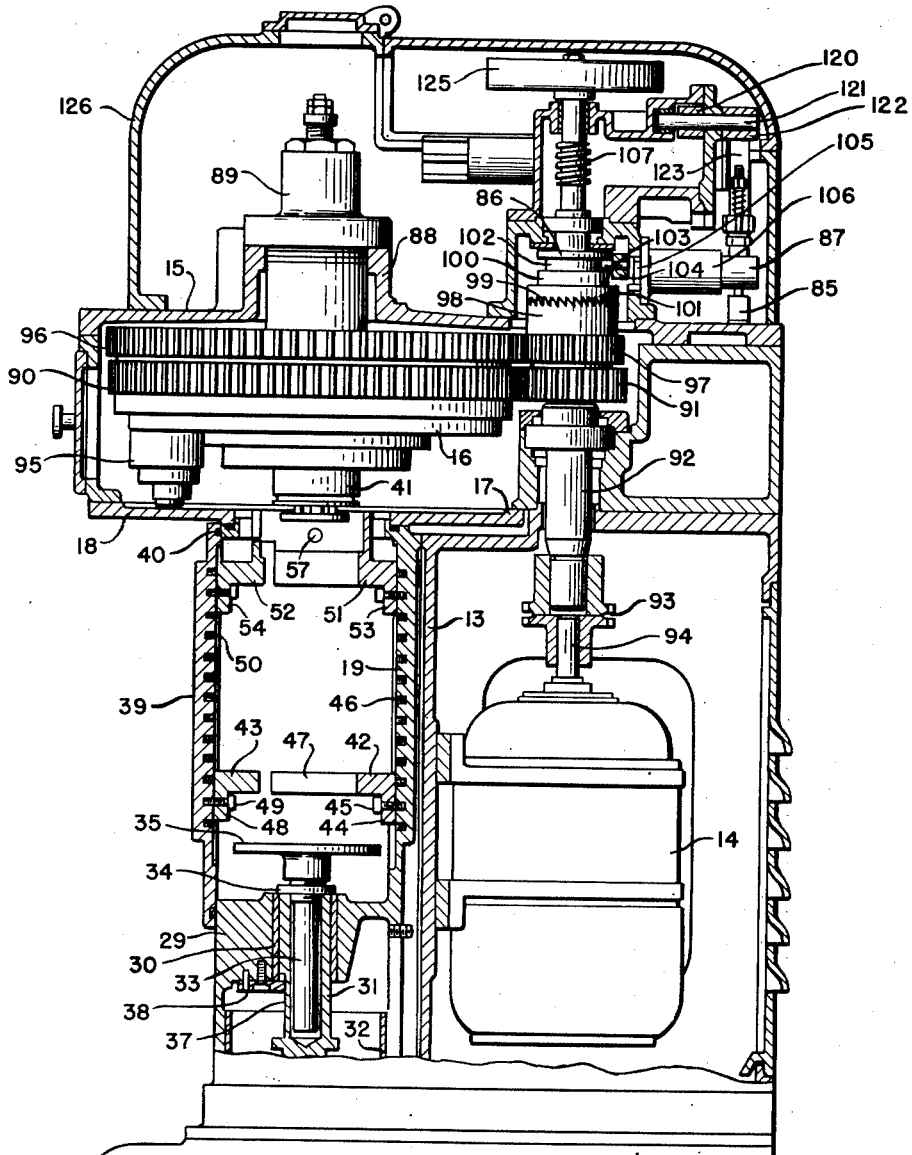
Fig. 2 is a vertical section of parts of the machine including the cover, taken on line 2—2 of Fig. 1.
Figure 3:
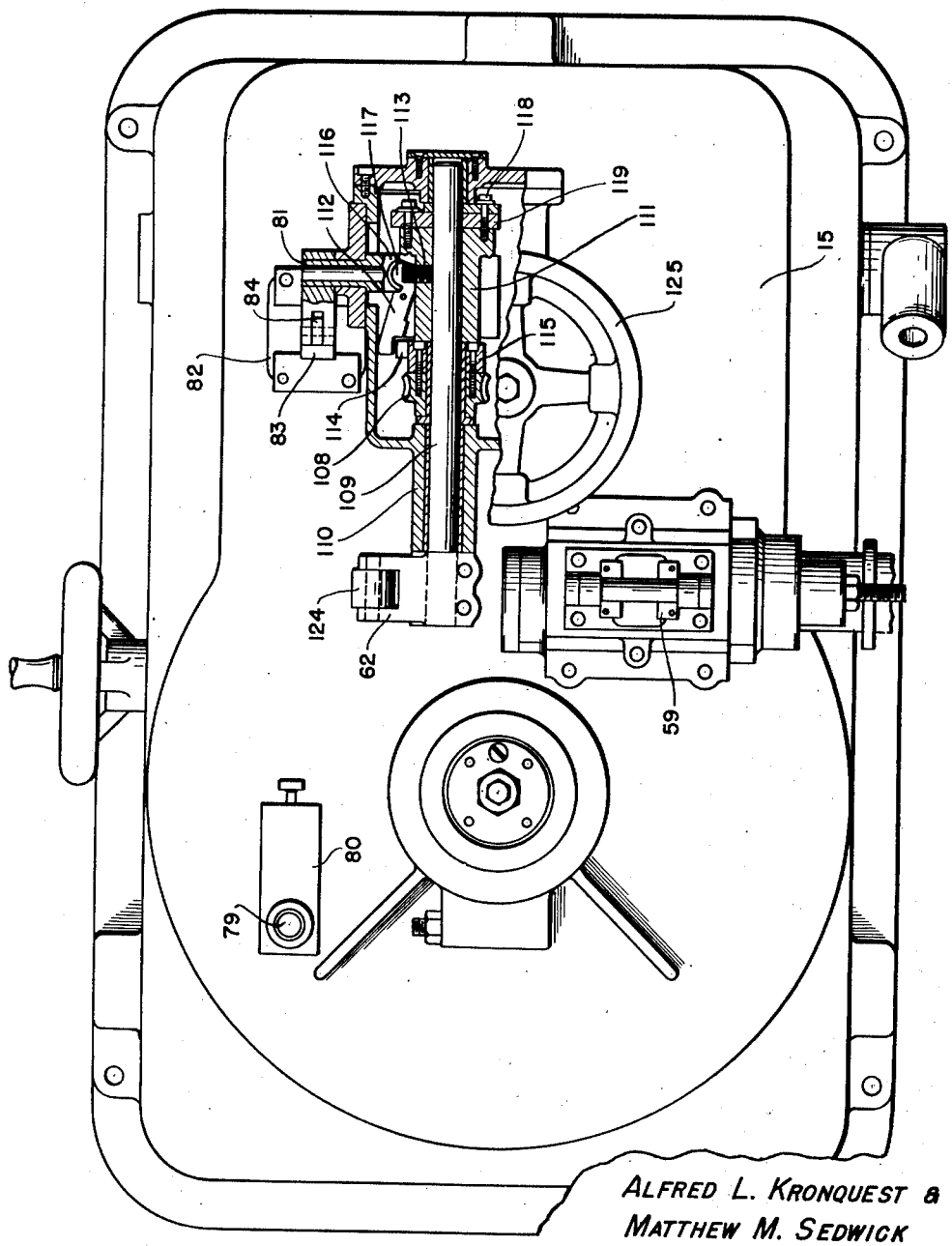
Fig. 3 is a top plan view of the machine shown in Fig. 1 with the cover removed.

The housing 15 extends forward in advance of the partition 13 and provides a downwardly directed opening 17. This opening is removably covered by a bottom plate 18. Plate 18 has a central aperture through which the sealing or vacuumizing equipment extends. The plate 18 is arranged to close the opening in the housing 15, but to be easily removable to afford access for servicing or adjusting the seaming mechanism. Normally the plate 18 is held in place by the vacuum bell or chamber 19 as shown in Fig. 2, gaskets being interposed between the plate and the housing 15 and the vacuum bell respectively.

To facilitate removal of the plate 18, the bell 19 is mounted to move vertically on the front of the partition 13 of the casing 12 so that it may be lowered, thereby making it possible to slide the plate 18 out horizontally.

In the illustrated embodiment the mechanism for moving the bell vertically includes a screw 20 secured to a lug 21 on the bell. The screw has threaded engagement with a captive nut 22 mounted to rotate in a bracket 23 carried on the base. The exterior of the nut 22 is formed as a worm wheel engaging a worm 24 carried by a shaft 25 rotatable in a bearing 26 mounted on the base. A hand wheel 27 is provided for rotating the shaft 25 and thus raising or lowering the bell 19. A curb plate 28 extends across the base 11 in front of the partition 13 and permits vertical movement of the bell 19.

Bell 19 has an intermediate bottom wall 29. Bottom wall 29 of the bell 19 is apertured to receive a bearing 30 for reciprocally mounting can positioning means comprising a lifting rod member 31.

Beneath the bottom wall 29 is a vertical cylinder 32 into which the lifting rod member 31 extends. The rod 31 is bored inwardly from its upper end to receive a stem 33 having threaded engagement with the rod 31 to permit vertical adjustment of the stem with respect to the rod. A lock nut 34 is provided for holding the stem 33 in vertically adjusted position. A can support or pad element 35 is keyed to the upper end of the stem 33. The rod 31 is flattened on one side at 37 to provide sliding engagement with a block 38 for preventing rotation of the rod 31 and pad element 35.

The rod extends downwardly beyond the bearing 30 into the lifting cylinder 32 and thence freely through a sleeve shaft extending downwardly from a piston mounted to reciprocate in the cylinder 32 in the manner more fully illustrated in the application above mentioned. Vertical movement is thus imparted to the can pad 35 in order to present the can to the seaming chuck at the appropriate time.

The front of the bell 19 carries a pivoted door 39 which has a gasket 40 for establishing airtight closure.

The seaming mechanism 16 includes a chuck element 41 disposed centrally over the pad 35 and also centrally of seaming rolls, not illustrated.

The chuck is non-rotatable and serves to hold a can and a can cover against rotation when they are pressed up against the bottom of the chuck. Means are provided for centering and aligning the can with respect to the chuck. To this end the bell 19 and its door 39 are provided with separate means for embracing a can carried by the pad 35. As shown in Fig. 2, can holders 42 and 43 are carried by the bell 19 and the door 39 respectively adjacent the bottom of the bell. The holder 42 is generally of a U shape and includes a flange 44 secured by screws 45 to the rear wall of the bell. Preferably the bell is provided with a vertically extending series of attaching stations comprising tapped holes 46, selected ones of which receive the screws 45 for adjusting the height of the holder 42 in accordance with the size of the can to be sealed. The holder 42 includes parallel legs or sides 47.

The complementary door-mounted holder 43 includes a flange 48 adapted to be secured by screws 49 engageable selectively in vertically spaced tapped holes 50 of attaching stations.

Similar holders 51 and 52 mounted on the bell and door respectively at the top of the bell are formed with vertical extensions 53 and 54 respectively for embracing the upper end of a can and a can top positioned in readiness for chucking and then sealing.

In operation, when a can and superposed can cover are placed on the pad 35 and the door 39 is closed, the holders 42, 43, 51 and 52 will center or align the can and the can cover with respect to the pad 35 and the chuck 41.

A vacuum pump communicates through a conduit 55 with a valve 56, in turn communicating with the chamber or bell 19 by means of a conduit 57. The valve 56 is provided at 58 with an outlet to the atmosphere. Actuation of the valve is controlled by a solenoid 59 operatively connected to the valve at 60 and being connected across an electric power supply line by means of conductors having an interposed switch 61 mounted on the side of the bell 19 near the door 39. The switch is normally open and is adapted to be closed only momentarily when the sealing chamber door is closed.

Momentary energization of the solenoid 59 operates the member 60 to permit the valve 56 to be operated to place the conduit 55 in communication with the sealing chamber 19. Although the switch 61 is closed only momentarily in response to movement of the door to closed position, the valve 56 will remain in its operated (open) position until it is reset by rotation of a resetting arm 62, engageable with a follower 63 projecting from the valve element 65.

Arm 62 is normally at rest but is brought into operation when a can is brought into chucked position and is timed so as to reset the valve and place chamber 19 in communication with the outlet 58 to the atmosphere as soon as the seaming operation has been performed.

Figure 4:
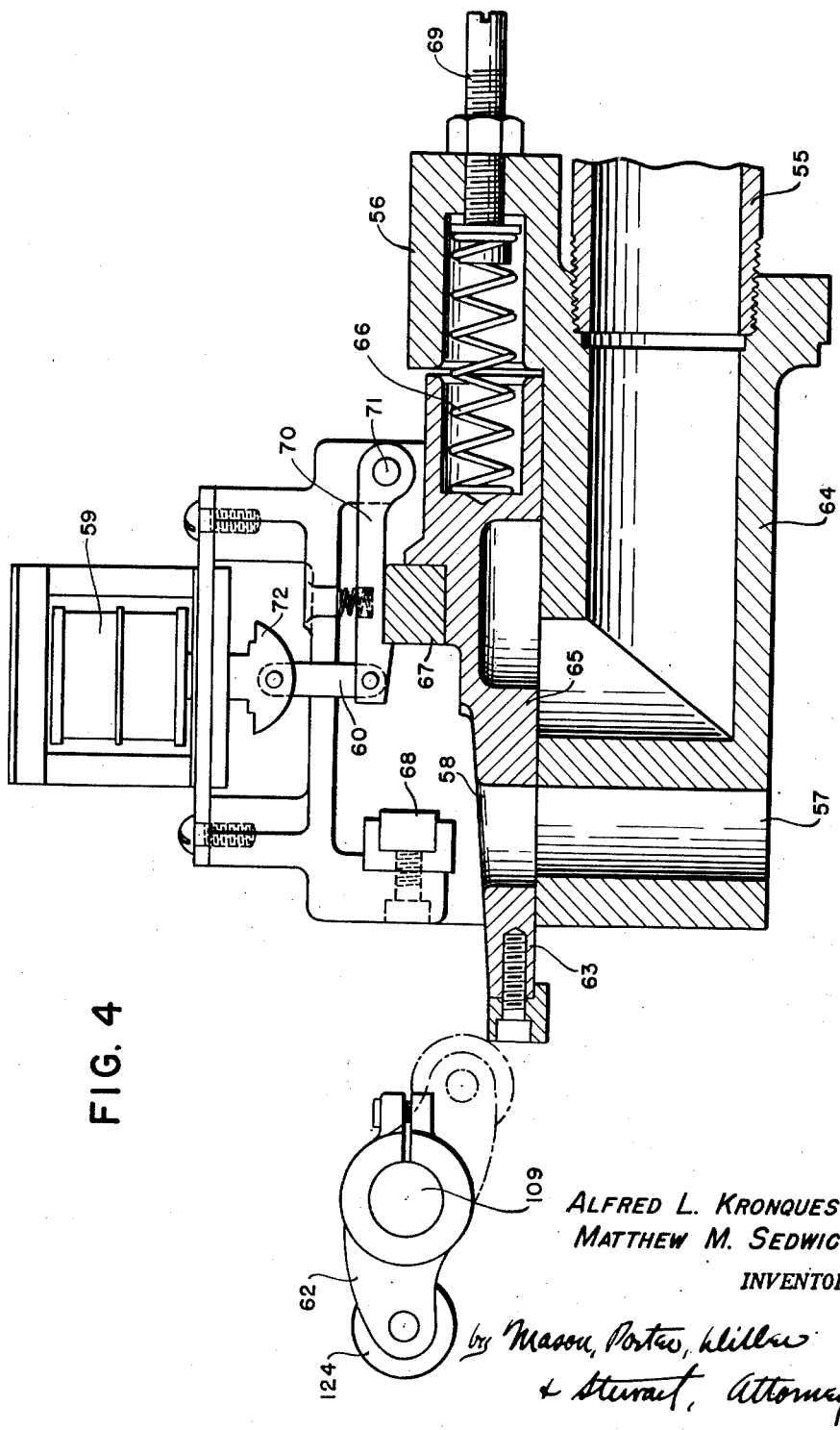
Fig. 4 is a longitudinal vertical section of the valve for controlling the vacuumizing of the sealing chamber, and the solenoid operated mechanism for controlling the operation of the valve.

As previously explained, closing of the door 39 momentarily closes the switch 61, thereby operating the valve operating solenoid 59 and the valve 56 so as to vacuumize the sealing chamber. As shown in Figure 4 the valve 56 comprises a body 64 and a reciprocable "D" valve element 65 urged by a spring 66 to a position providing communication between the conduit 55 leading to the vacuum pump and the conduit 57 leading from the sealing chamber. A pad 67 on the valve element 65 is engageable with a stop 68 on the valve body 64 for limiting the throw of the valve element 65 under urge of the spring 66. A screw 69 is provided for adjusting the loading of the spring 66.

A latch 70 pivoted as at 71 on the valve body 64 normally engages the pad 67 for maintaining the valve element 65 in the non-vacuumizing position shown in Figure 4 wherein the sealing chamber communicates through the conduit 57 with the atmospheric outlet 58. For permitting the spring 66 to move the valve to vacuumizing position, the plunger 72 of the solenoid 59 is connected through the link member 60 to the latch 70. Thus when the solenoid 59 is energized momentarily, the latch 70 is lifted and the spring 66 will move the valve element 65 to place the sealing chamber in communication with the vacuum pump through the conduits 57 and 55. The valve element 65 will remain in this position until it is reset by actuation of the arm 62 previously referred to.

Figure 5:
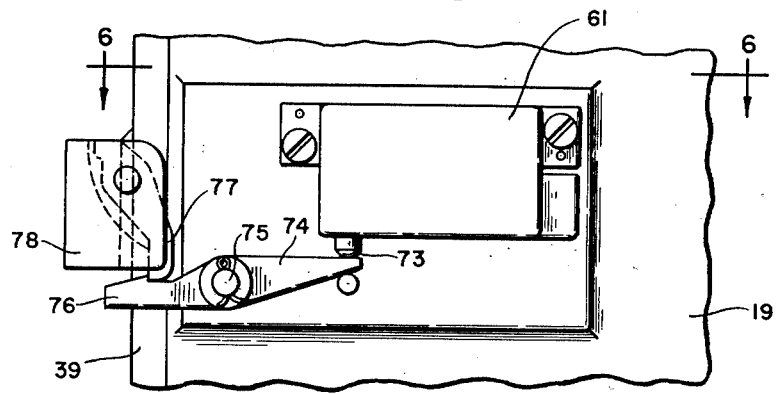
Fig. 5 is an enlarged fragmentary view in elevation of the door-operated switch and Fig. 6 is a horizontal section of the same taken on the line 6—6 of Fig. 5.
Figure 6:
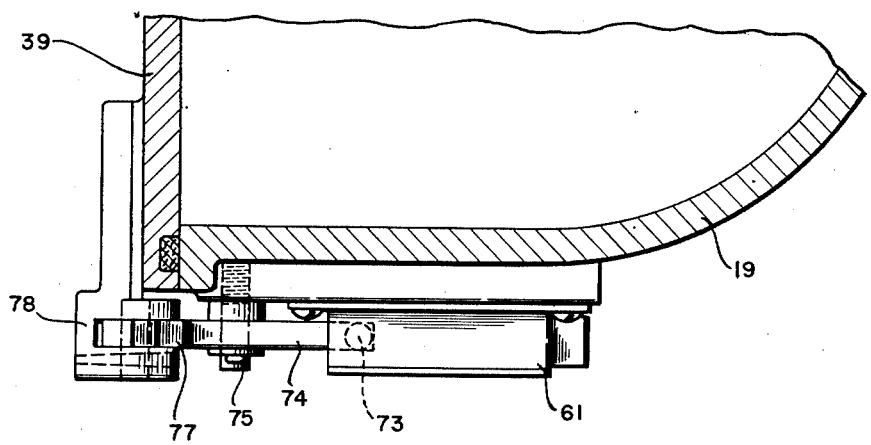

As shown in Figures 5 and 6, the switch 61, which is operable in response to closing of the door 39, includes an operating button 73 positioned to be moved by a lever or rock arm 74 pivoted as at 75 on the bell casing 19. The lever 74 is formed with a nose 76 adapted to be engaged by a pawl 77 pivoted as at 78 on the door 39. When the door is moved to closed position, the pawl 77, being held against clockwise movement as viewed in Figure 5 by contact with a stop pad 78 on the door, engages the nose 76 of the lever 74 and cams it to rock the lever 74 and push inwardly on the switch button 73. When the door moves to its completely closed position, the pawl 77 will proceed beyond the nose 76 of the lever 74, permitting the switch button 73 to return the lever 74 to its initial position. Thus the circuit through the valve operating solenoid 59 will be closed only momentarily while the pawl 77 is riding over the nose 76 during the closing of the door.

When the door is opened the pawl 77 will engage the nose 76 and will rock freely in a counterclockwise direction as viewed in Figure 5 so as to ride over the nose 76 without rocking the lever 74 and without closing the switch 61. Therefore, the solenoid 59 will not be energized when the arm 62 resets the valve element 65 and the latch 70 will be free to re-engage the pad 67 and hold the valve element 65 in its Figure 4 position until the door 39 again is moved from its open to its closed position to start a new cycle.

When the desired predetermined degree of vacuum has been produced in the chamber 19, the can pad 35 rises and moves the can first to pick up the can cover and then into chucked position in readiness to be sealed.

The housing 15 supports a switch 79 arranged to be closed by contraction of a Sylphon bellows 80 which is in constant communication with the housing 15. The arrangement is such that when the desired predetermined degree of vacuum has been produced in the chamber 19 the bellows closes the switch 79 thereby energizing the solenoid for actuating the chucking movement.

Movement of the can to completed chucked position automatically brings about operation of the seaming mechanism to be described hereinafter. Generally stated, the seaming mechanism may be similar to that shown in the patent to Kronquest 2,271,152 granted January 27, 1942. Operation of the seaming mechanism is initiated by rocking of a clutch release shaft indicated at 81 on Fig. 1, under the action of a solenoid 82 mounted on the housing 15 and having an operating member 83 connected to the shaft 79 by an arm 84 fast with the shaft. The solenoid 82 is connected across the electric power line by conductors, the latter having inter-positioned therein a normally closed switch 85 and a normally open switch operated by the elevating mechanism.

When the can moves to chucked position, the last named switch is closed, thereby energizing the solenoid 82 to effect rocking of the shaft 81 to, in turn, effect engagement of a one-revolution pilot clutch 86 in operation of the seaming mechanism controlled thereby. As soon as the one-revolution clutch is engaged and begins to drive, it actuates an interrupter arm 87 which opens the switch 85 to deenergize the solenoid 82. However, deenergizing of the solenoid 82 will not immediately disengage the pilot clutch and the latter will drive through a complete revolution.

When the seaming operation has been performed, the resetting arm 62, which is moved in timed relation to the seaming mechanism, will engage the follower 63 and operate the valve member 65 to place the chamber 19 in communication with the atmosphere at 58, thereby relieving the vacuum in the chamber 19 and simultaneously opening the switch 79. This will retract the pad 35 to unchuck the can. This will take place before the pilot clutch has completed its one-revolution drive. Thus when the one-revolution clutch has completed a single revolution, it will become disengaged and cannot be re-engaged until a new and complete cycle is performed.

The operating parts for effecting the above results are described in greater detail in the prior application above referred to.

As previously stated, moving the can and can end to chucked position initiates operation of the seaming mechanism. Referring more particularly to the construction of the seaming mechanism, the stationary housing 15 fast with the frame has an upstanding flange 88 surmounted by a cap 89 secured to the flange by screws. From this cap the seaming head 16 is revolubly suspended.

A ring gear 90 secured to the head 16 meshes with a gear on pinion 91 fast on a shaft 92 coupled as at 93 to the shaft 94 on the electric motor 14. Thus the seaming head 16 is driven constantly when the motor 14 is in operation.

The seaming head 16 is formed with four equidistant spaced bearing sleeves 95.

When the seaming head is rotated, the can causes the seaming rolls (not illustrated) to trace a path similar to that disclosed in the Kronquest Patent No. 2,271,152 previously referred to.

In operation and prior to the conditioning of the apparatus for performance of the seaming operation, the seaming head 16 will rotate constantly so as to carry the rolls orbitally about the chuck 41. When the container to be sealed has been vacuumized and chucked, the seaming rolls will be moved into seaming position.

A large gear 96 for driving the cams for the seaming rolls rotates on the same axis as gear 90. The gear 96 is in mesh with the gear 97 journaled by a bearing so as to rotate freely about the shaft 92. Normally, there is no driving connection between the shaft 92 and the gear 97 and the gear 96 is free to rotate in unison with the head 16.

A driving clutch interposed between the shaft 92 and the gear 97 comprises a clutch member 98 secured to the gear 97 to rotate therewith and having jaw teeth 99, and a clutch member 100 splined to slide on but rotate with the shaft 92 and having jaw teeth 101. The clutch member 100 is formed with a groove 102 which receives a pin 103 carried by a lever 104 fixed to a shaft 105 journaled to rock in a fixed bearing 106. Rocking of the shaft 105 will move the clutch member 100 downwardly so as to effect engagement of the clutch teeth 101 with the teeth 99 on the clutch member 98. Thereafter, the gear 97 will be driven directly from the shaft 92.

Mechanism for rocking the shaft 105 to bring about operation of the seaming mechanism is actuated in response to closing of the normally open switch and consequently in response to movement of the can pad 35 to chucking position. The mechanism for rocking the shaft 105 includes a worm 107 rotatable in unison with the shaft 92 and meshing with a worm wheel 108 mounted to rotate freely on a shaft 109 journaled in a bracket 110. A predetermined period operation pilot clutch device includes a sleeve 111 secured to the shaft 109. The sleeve carries a pawl 112 urged by a spring 113 to move into the path of a lug 114 fast with a hub 115 secured to the worm wheel 108. Normally the pawl 112 is held out of the path of the lug 114 by a lever 116 fast with the clutch release shaft 81 previously referred to, the lever 116 being so mounted that in its normal position it bears against a heel 117 on the pawl 112 so as to urge the nose of the pawl radially away from the lug 114. When the shaft 81 is rocked the lever 116 will swing so as to move out of engagement with the pawl heel 117 thereby permitting the spring 113 to rock the pawl 112 and move its nose into the path of the lug 114. Thereupon the sleeve 111 and shaft 109 will be rotated in unison with the worm wheel 108.

Rotation of the sleeve 111 is utilized to rock the shaft 105 and effect engagement of the clutch elements 98 and 100 in the manner previously explained. Held fast to the sleeve 111 by screws 118 is a disc 119 formed with a notch. A pawl 120 fixed to a shaft 121 journaled on the bracket 110 has its nose normally received in the notch. Also fixed to the shaft 121 is a lever 122. A link 123 is pivoted to the lever 122 and is pivoted to the interrupter arm 87 previously referred to.

In operation, when the can and can end have been chucked the solenoid 82 will be energized by closing of the switch. Operation of the solenoid 82 will rock the arm 84 and the clutch release shaft 81 to thereby swing the lever 116 away from the pawl heel 117. The pawl 112 will become engaged with the lug 114 so as to cause the sleeve 111 to be rotated. The disc 119 will rotate with the sleeve 111, causing the pawl nose to be lifted out of the notch onto the periphery of the disc 117, thereby rocking the shaft 121 and the lever 122 to left the link 123, permit the normally closed switch 85 to open, and also to rock the shaft 105 and lever 104, thereby moving the clutch member 100 into engagement with the clutch member 98. The gear 96 will then be rotated with respect to the seaming head 16 so as to move the seaming rolls to seaming position. Opening of the switch 85 in response to operation of the one-revolution clutch will de-energize the solenoid 82 so as to permit the lever 116 to be moved back into the path of the pawl heel 117 but this will not interrupt driving engagement of the pilot clutch until the pawl 112 and sleeve 111 have made a complete revolution, whereupon the pawl heel 117 will become engaged with the lever 116 so as to move the nose of the pawl 112 out of engagement with the lug 114, whereupon the sleeve 111 will come to rest.

The resetting arm 62 previously referred to is fixed to the shaft 109 and is equipped with a roller 124 engageable with the follower 63 projecting from the valve 56 for shifting the valve element 65 to relieve the vacuum in the sealing chamber after the seaming operation has been performed. The operation is so timed that valve member 65 is re-set to relieve the vacuum in the chamber before the sleeve 111 and disc 119 have performed a complete revolution. Hence, before the pawl nose re-enters the notch in the disc 119, the Sylphon bellows 80 will expand and open the switch 79, thereby opening the starting switch. Thereafter, when the pawl nose re-enters the notch, resultant closing of the switch 85 will not energize the solenoid 82, the circuit to which is broken by the open starting switch.

The pawl nose will re-enter the slot just as the nose of the pawl 112 is moved out of engagement with the lug 114, the drive clutch elements 98 and 100 will be disengaged to stop the seaming operation, and the parts will be brought to rest in their starting positions in readiness for performance of a new cycle.

A fly wheel 125 secured to the top of the shaft 92 may be turned manually for moving the parts slowly for adjusting or timing purposes.

Preferably a mechanism cover 126 is removably mounted on top of the frame.

The machine disclosed herein embodies the invention in the form now preferred but it will be understood that changes may be made without departing from the invention as defined in the claims.

What we claim is:

1. In a container sealing machine, a sealing chamber having an access opening; a door for closing said opening; means for drawing a vacuum; a valve for controlling communication between said chamber selectively with the atmosphere and said vacuum drawing means; a spring for urging said valve to an open position in which it affords vacuumizing communication of said vacuum drawing means with said chamber; a latch for holding said valve against the urge of said spring in a closed position in which the valve cuts off communication between said vacuum drawing means and said chamber and vents the latter to the atmosphere; a solenoid for releasing said latch; and a switch responsive to closing of said door for effecting operation of said solenoid with consequent releasing of said latch and spring-urged movement of said valve to open vacuumizing position.

2. In a container sealing machine, a sealing chamber having an access opening; a door for closing said opening; means for drawing a vacuum; a valve for controlling communication between said chamber selectively with the atmosphere and said vacuum drawing means; a spring for urging said valve to an open position in which it affords vacuumizing communication of said vacuum drawing means with said chamber; a latch for holding said valve against the urge of said spring in a closed position in which the valve cuts off communication between said vacuum drawing means and said chamber and vents the latter to the atmosphere; a solenoid for releasing said latch; a switch in circuit with said solenoid; means responsive to closing of the door for momentarily closing said switch and thereby effecting momentary releasing of said latch and consequent spring-urged movement of said valve to open vacuumizing position; and cam means independent of the door for closing the valve and latching it in non-vacuumizing position.

3. In a container sealing machine, a frame; a seaming mechanism housing fixed with respect to the frame; seaming mechanism within said housing; a sealing chamber bell mounted on said frame for movements toward and from said housing, said housing being formed with an opening facing toward said bell; a closure plate removably interposed between said bell and said housing; and means for moving said bell toward said housing for engaging said plate and holding it in place to close said opening and for moving said bell away from said housing to release said plate for its removal to provide access to said seaming mechanism.

4. In a container sealing machine of the class wherein a sealing chamber is provided with a door for closing an opening in the chamber and a valve controls communication of the chamber selectively with the atmosphere and with a means for drawing a vacuum, the combination with said valve and said door of a spring for urging said valve to an open position in which it affords communication of said vacuum drawing means with said chamber; a latch for holding said valve against the urge of said spring in a closed non-vacuumizing position in which the valve cuts off communication between said vacuum drawing means and said chamber and vents the latter to the atmosphere; means including a solenoid for releasing said latch; and means including a switch responsive to closing of said door for effecting actuation of said solenoid with consequent releasing of said latch and spring-urged movement of said valve to open vacuumizing position.

5. In a container sealing machine of the class wherein a sealing chamber is provided with a door for closing an opening in the chamber and a valve controls communication of the chamber selectively with the atmosphere and with a means for drawing a vacuum, the combination with said valve and said door of a spring for urging said valve to an open position in which it affords vacuumizing communication of said vacuum drawing means with said chamber; a latch for holding said valve against the urge of said spring in a closed non-vacuumizing position in which the valve cuts off communication between said vacuum drawing means and said chamber and vents the latter to the atmosphere; means including a solenoid for releasing said latch; switch means in circuit with said solenoid; means responsive to closing of the door for momentarily closing said switch and thereby effecting momentary releasing of said latch and consequent spring-urged movement of said valve to vacuumizing position; and cam means for closing the valve and latching it in non-vacuumizing position.

ALFRED L. KRONQUEST.
MATTHEW M. SEDWICK.

REFERENCES CITED

The following references are of record in the file of this patent:

UNITED STATES PATENTS

| Number | Name | Date |
|---|---|---|
| 1,244,508 | Kramer | Oct. 30, 1917 |
| 1,646,704 | Nordquist | Oct. 25, 1927 |
| 1,848,827 | Fink et al. | Mar. 8, 1932 |
| 1,983,252 | Troyer | Dec. 4, 1934 |
| 2,033,951 | Nordquist | Mar. 17, 1936 |
| 2,071,683 | Charlton | Feb. 23, 1937 |
| 2,183,903 | Ardron | Dec. 19, 1939 |
| 2,351,633 | Peterson | June 20, 1944 |
| 2,361,863 | Miller | Oct. 31, 1944 |
| 2,450,243 | Kronquest et al. | Sept. 28, 1948 |